United States Patent [19]

Donaldson et al.

[11] Patent Number: 4,708,430

[45] Date of Patent: Nov. 24, 1987

[54] CABINET FOR OPTICAL CABLE TERMINATING EQUIPMENT

[75] Inventors: Michael J. Donaldson, Ottawa; James D. Pue-Gilchrist, Richmond; James R. Scott, Ashton, all of Canada

[73] Assignee: Northern Telecom Limited, Montreal, Canada

[21] Appl. No.: 665,636

[22] Filed: Oct. 29, 1984

[51] Int. Cl.⁴ .............................................. G02B 6/36
[52] U.S. Cl. .................................................. 350/96.20
[58] Field of Search ................ 350/96.20, 96.21, 96.22

[56] References Cited

U.S. PATENT DOCUMENTS

| | | | |
|---|---|---|---|
| 4,319,951 | 3/1982 | Korbelak et al. | 350/96.22 X |
| 4,595,255 | 6/1986 | Bhatt et al. | 350/96.20 |
| 4,630,886 | 12/1986 | Lauriello et al. | 350/96.20 |

FOREIGN PATENT DOCUMENTS

| | | | |
|---|---|---|---|
| 2538918 | 7/1984 | France | 350/96.20 |
| 58-117513 | 7/1983 | Japan | 350/96.20 |

Primary Examiner—John Lee
Attorney, Agent, or Firm—Schwartz, Jeffery, Schwaab, Mack, Blumenthal & Evans

[57] ABSTRACT

A cable terminating cabinet for terminating optical waveguide cables contains an array of optical waveguide connectors one side of each connector having a pigtail fiber attached to it, the pigtail fibers being spliced to waveguides of a cable terminated at the cabinet. Waveguides terminating at the other side of the connector are taken to electro-optic units where optical signals within the fibers are converted into corresponding electrical signals. The cabinets find application either at a central office cable terminating frame or in a test access unit at a location remote from the central office. The connectors are mounted in a panel which is exposed when a front cover of the cabinet is removed, the panel being pivoted about a vertically orientated hinge to expose a stacked set of splice organizing trays at the rear of the cabinet. Ready access is therefore possible to both the connector panel and the splice organizing trays. However the frontal area of the cabinet is small and, because access can be gained to both the trays and the connectors from the front of the cabinet, the cabinet can be wall mounted so saving space in a central office or test access location.

8 Claims, 3 Drawing Figures

CABINET FOR OPTICAL CABLE TERMINATING EQUIPMENT

This invention relates to an optical waveguide terminating assembly for use where optical cables enter or leave a central office or an external cable access location.

Prior optical cable terminating arrangements for use in a central office environment are generally mounted for access from both front and rear. In such arrangements, removal of a front panel exposes a series of connectors which are connected from one side via optical waveguides to light sources or detectors. Pigtail fibers extending from the remote side of the connectors are spliced to the waveguides of incoming optical cables and mounted within a splice organizing tray, several of which are stacked and secured at the rear of the cabinet so as to be exposed when a cabinet rear panel is removed.

In a more recent implementation of a fiber optic test access and patch cabinet produced by Western Electric, access is only possible from the front surface of the cabinet but the area of the cabinet against a rear supporting wall is comparatively large since a connector array is located vertically above a series of stacked organizing trays so that once the panel is removed either one of the trays or the connectors is easily accessed.

In order to save space within the central office or outside plant location, an optical cable terminating equipment according to the present invention comprises a cabinet, a removable cover at the front of the cabinet, an array of optical connectors mounted within the cabinet, a stack of optical splice organizing trays mounted within the cabinet and cable entry and cable exit means in opposed sides of the cabinet, wherein the connectors are mounted on a panel pivotable about a vertical axis to permit the removal of the connectors from the cabinet interior so as to expose the stack of organizing trays, the trays mounted at the rear of the cabinet and being readily removable from the front of the cabinet.

The panel can be mounted on a hinge having a vertical axis, the panel mounted to the hinge by an angled mounting arrangement whereby the panel can be pivoted so as to fully expose the interior of the cabinet. The panel preferably has optical waveguide organizing channels attached thereto for guiding optical waveguide pigtail fibers extending from opposed parts of the connectors around a radius sufficiently large to maintain stress on the fiber of an acceptably low level. The channels can have apertures therethrough to receive flexible cable and waveguide clamps. The arrangement can have a hinge support portion mounted to the cabinet at one side of the opening and a corresponding hinged portion attached to the panel. The cabinet can have a further hinge support portion on the other side of the opening so that the hinged panel can be inverted to transfer the hinge locations from one side of the opening to the other to permit the panel to be pivoted out of the opening on either the right- or left-hand side. To take account of the cable guiding requirement, the channels can be removable from the panel for fixture at an opposed edge thereof when the hinged panel is transferred from one hinge support portion to the other.

The cabinet preferably has cable chutes or ducts attached to the outside of the cabinet side walls, the cabinet side walls also having apertures therein adjacent a lower end of the chutes to permit the cables to be guided into the cabinet interior. Preferably the fiber lengths within the cabinet are such that cabled fiber entering at one side of the cabinet extends via cable clips to the other side of the cabinet and then enters input ends of the optical splice organizing trays. Similarly fibers from the output sides of the trays can be directed forwardly and pass close to said other side of the cabinet and then be directed towards said one side of the cabinet before entering one of the guiding channels.

By guiding fiber in this way sharp bends in the fiber which would cause untenable stresses are avoided. The connectors preferably include at least one part having a flange buttable against the panel, aligned holes being formed within the flange and the panel to receive snap rivets. The stacked trays can be clipped together by engaging means associated with each tray. The lowest of the stacked trays can be clipped to an upstanding portion on a support bracket integral with a rear wall of the cabinet. A plurality of cable clips can be attached to a floor of the cabinet adjacent the rear surface of the cabinet. The front cover can include a plurality of angled tabs whereby the front cover can rest in a partially open position, the tabs being removable from slots within a floor of the cabinet to allow total withdrawal of the front cover.

An embodiment of the invention will now be described by way of example with reference to the accompanying drawings in which.

Figure 1:
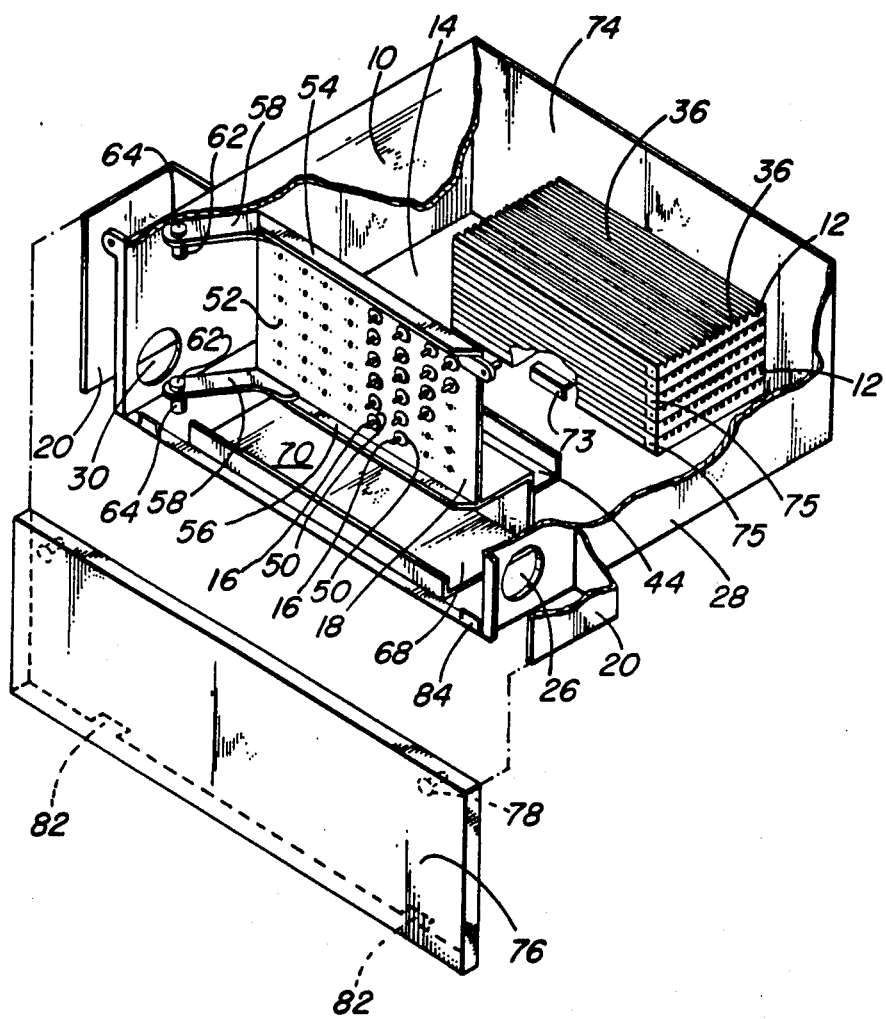
FIG. 1 is a perspective view with part cut away of a cable terminating equipment of the present invention.

Referring in detail to FIG. 1, there is shown a parallelopiped cabinet 10 having a series of splice organizing trays 12 mounted on a bracket 14 at the rear of the cabinet and an array of optical connectors 16 mounted on a panel 18 at the front of the cabinet.

Figure 2:
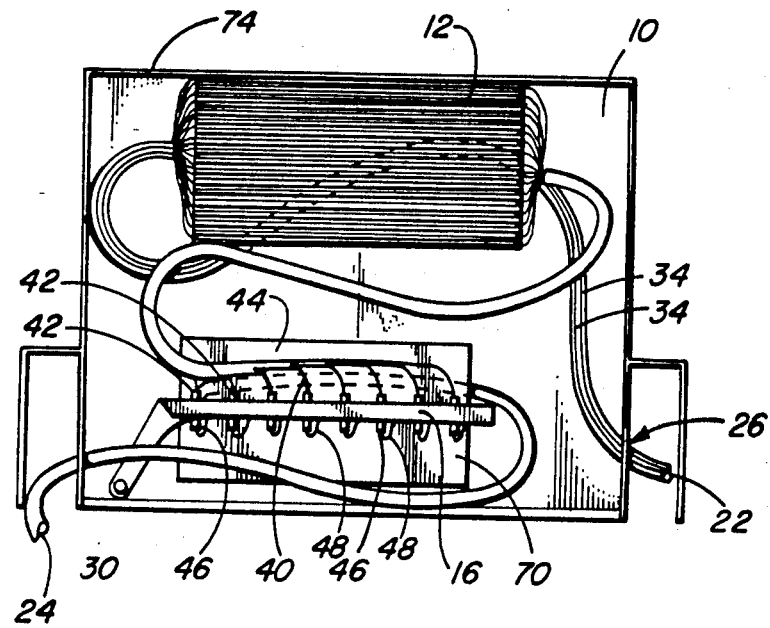
FIG. 2 is a schematic plan view showing the interior of the FIG. 1 cabinet with optical connectors and splice organizing trays mounted within the cabinet.
Figure 3:
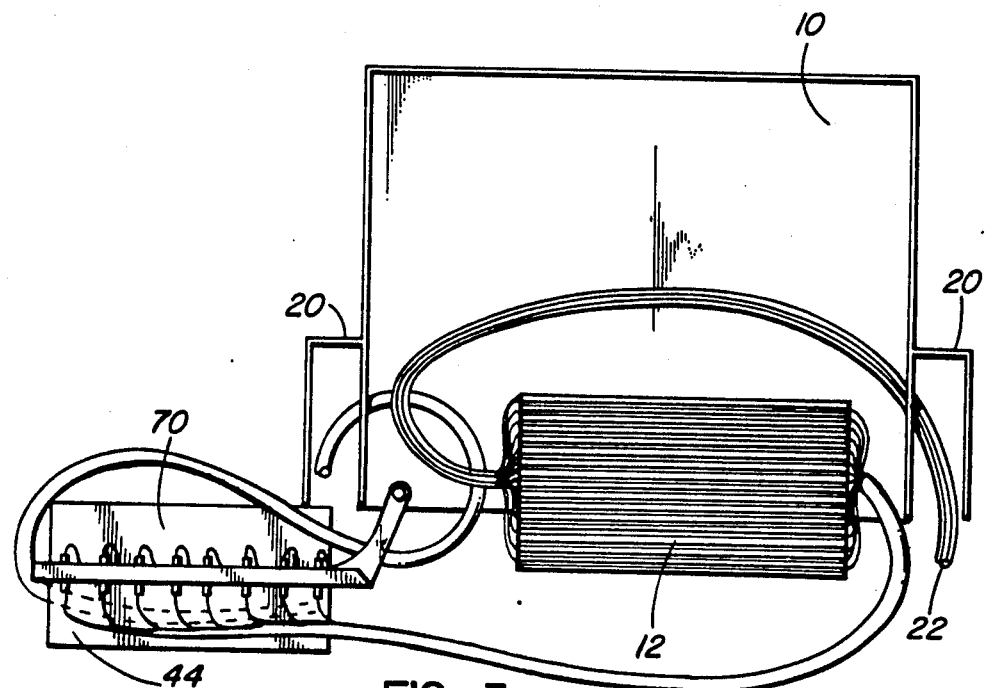
FIG. 3 is a schematic plan view corresponding to FIG. 2 but showing a connector array and a stack of splice organizing trays removed from the interior of the cabinet to allow test or repair access.

The panel 18 is hinged to the cabinet 10 at one side of the front opening and can be pivoted from a position shown in FIG. 2 to the position shown in FIG. 3 to expose the interior of the cabinet. The stack of splice organizing trays 12 can then be detached from the bracket 14 and removed from the position shown in FIG. 2 to that shown in FIG. 3 whereby both the connectors and the splice organizing trays are readily accessible for repair, replacement or testing.

The cabinet can stand alone or several can be mounted in a vertical array. Each cabinet has brackets 20 attached to the outside surface of opposed sides, the brackets 20 in a vertically ordered array of cabinets forming vertical guides for guiding input cables 22 and output cables 24. For ease of reference, the cables and fibers are shown only in FIGS. 2 and 3. The input cables 22 extend through an aperture 26 in one side wall 28 and the output cables 24 extend through an aperture 30 in opposed side wall 32. The fibers of the input cable are exposed back to a point adjacent to the aperture 26. Plastic support tubes 34 are threaded onto the exposed fibers and the tube end portions are strapped into grooves of an exposed portion of cable core. The tubes are retained by resilient plastic clips (not shown) attached to the floor of the cabinet, the clips acting to guide the supported waveguides laterally underneath the stacked trays 12. The tubes 34 containing waveguides are bundled by plastic retaining devices (not shown) and the bundle bends round towards trays 12 where individual waveguides are divided out and enter appropriate trays. The trays 12 can be of the type described in our co-pending U.S. patent application Ser. No. 560,541, filed Dec. 12, 1983, now U.S. Pat. No. 4,489,830, each tray having a series of grooves 36 or holders each of which can hold an optical splice package such as that described in our co-pending patent application. Within each splice package a fiber of the input cable 22 is attached to a pigtail fiber 40 which extends back to one part 42 of a connector 16. The pigtail fibers 40 are accommodated within a channel section part 44 which is screw attached to the panel 18. Part 44 has a number of apertures (not shown) at which flexible ties can be mounted to anchor the pigtail fibers in a bundle. On the remote side of the panel 18 are optical fiber connector parts 46 which engage respective connector parts 42. The two parts of each connector together with pigtail fibers 40 and 48 can be purchased as a single unit from Dorran. Each of the connector parts 46 has a flange 50 through which extend bores aligned with corresponding bores within the panel 18. The connectors are fixed into apertures 52 within the panel by driving plastic snap rivets into the aligned bores. Suitable rivets can be obtained from Richco under the specification number SR530. The pigtail fibers 48 extend from the cabinet to corresponding connectors at optical/electrical conversion equipment (not shown).

The panel has top and bottom rails 54 and 56 integral with angled parts 58. Aligned apertures extend through the angled parts 58. Screws 62 extend through respective apertures and locate within bushes 64 to mount the panel between studs integral with the cabinet top and bottom walls.

The lower bush 64 is sufficiently long to allow clearance for a double channel member 68. As previously discussed, the member 68 has a first channel 44 which guides pigtail fibers from the splice trays to the connector parts at the rear surface of the panel 18. A second channel 70 provides support for pigtail fibers 48 on the front side of the panel which extend as a bundle through the aperture 30 and are guided up the associated bracket 20 to the optical/electrical conversion equipment. The channel 70 is sufficiently wide that fibers are not curved more tightly than the required radius of curvature for acceptable waveguide stress.

As previously indicated, the splice trays 12 are, for example, of the design described in our co-pending patent application mentioned previously. The lowest tray extends between upstanding tabs and has a lip which engages underneath the upstanding part 73 to clamp the lowest tray. Because the trays are clipped together at retaining parts 75 the whole stack of trays is clamped in position against a back wall 74 of the cabinet.

The unit is particularly adapted for ready access to both the front and back connector parts 46 and 42 respectively and the splice organizing trays 12. To gain complete access, front cover 76 is removed by pushing the cover to disengage spring clips 78 from retention flanges (not shown). The cover 76 is then removed from the cabinet by lifting to extract tabs 82 from slots 84. The panel 18 is then pivoted on the hinge from the position shown in plan view in FIG. 2 to the position shown in plan view in FIG. 3. At this point if the fault or test target is one of the splice trays 12, the stack of trays is removed by lifting the stack to disengage the lip on the bottom tray from the upstanding part 73. The stack of trays 12 together with the jacketed fibers interconnecting the connector panel 18 to the trays can then be brought forward out of the cabinet to allow easier working or testing. Before extracting the wiring, the cable or sheathed fiber must first be extracted from cable and fiber retaining clamps (not shown) within the cabinet.

As indicated previously several of the cabinets can be stacked vertically, the brackets 20 then forming a vertical guide servicing all of the terminating units in a particular column.

Depending on the location of the cabinet, the panel can be made to hinge either to the left as shown in FIGS. 1 to 3 or to the right. To change the direction in which the panel pivots, the hinge hardware is moved from the left-hand side of the opening to engage with corresponding studs at the right-hand side of the opening and the panel is inverted so that the top bracket 58 becomes the bottom bracket.

What is claimed is:

1. An apparatus comprising:
    a cabinet;
    a removable cover for enclosing the cabinet at the front of the cabinet;
    a stack of optical splice organizing trays removably mounted at a rear portion of the cabinet;
    cable entry and cable exit openings formed, respectively, in opposed sides of the cabinet;
    a panel mounted within the cabinet and pivotable about a vertical axis at a front portion of the cabinet to expose the stack of splice organizing trays, the panel being movable from a first position across the cabinet to a second position providing an opening to remove the splice organizing trays such that access to the splice organizing trays can be had through the front of the cabinet when the cover is removed and the panel is moved to its second position; and
    an array of optical connectors mounted on the panel such that said optical connectors move with said panel, said optical connectors extending through said panel such that opposite sides of said optical connectors are exposed when said panel is moved from said first position to said second position.

2. Apparatus as claimed in claim 1 in which the panel is mounted on a hinge having a vertical axis, the hinge axis located at one side of the front of the cabinet.

3. Apparatus as claimed in claim 2 in which the panel is mounted to the hinge by angled mounting brackets whereby the panel can be pivoted so as to fully expose the interior of the cabinet.

4. Apparatus as claimed in claim 2 in which the cabinet has hinge support portions mounted to the cabinet at opposite sides thereof and a corresponding hinge supported portion attached to the panel, the two hinge support portions enabling the panel to be mounted to either side of the cabinet to permit left- or right-hand opening.

5. Apparatus as claimed in claim 1 in which the panel has optical waveguide organizing channels attached thereto for guiding optical waveguides from input and output cables around a radius greater than a predetermined magnitude.

6. Apparatus as claimed in claim 5 in which the channels have apertures therethrough to receive flexible cable and waveguide clamps.

7. Apparatus as claimed in claim 1 in which the cabinet has cable guides attached to outside cabinet side walls, the cabinet side walls having apertures therein adjacent lower ends of the guides to permit input and output cables to be guided into the cabinet interior.

8. Apparatus as claimed in claim 1 in which cable fixture means are anchored to the cabinet interior, the fixture means functioning: (i) to guide an input cable from an entry position at one side wall across to the opposing wall, adjacent to which opposing wall fibers fan out to the stack of splice organizing trays; (ii) to guide an output cable from an entry position at the opposed side wall across to said one side wall where fibers fan out to connector parts on one face of the panel, and; (iii) to guide an internal fiber bundle in a serpentine disposition from connector parts at the reverse face of the panel towards one of the cabinet sides across to the opposed cabinet side to fan out at the splice organizing trays.

* * * * *